United States Patent
Eggers et al.

(10) Patent No.: US 10,343,389 B2
(45) Date of Patent: Jul. 9, 2019

(54) SUPPORT STRUCTURE FOR AN OBJECT MADE BY MEANS OF A RAPID PROTOTYPE PRODUCTION METHOD

(71) Applicant: MATERIALISE NV, Leuven (BE)

(72) Inventors: Gerald Eggers, Oud-Heverlee (BE); Kurt Renap, Herenthout (BE)

(73) Assignee: Materialise N.V., Leuven (BE)

( * ) Notice: Subject to any disclaimer, the term of this patent is extended or adjusted under 35 U.S.C. 154(b) by 813 days.

(21) Appl. No.: 14/557,162

(22) Filed: Dec. 1, 2014

(65) Prior Publication Data

US 2015/0151494 A1    Jun. 4, 2015

Related U.S. Application Data

(63) Continuation of application No. 12/682,488, filed as application No. PCT/EP2008/063690 on Oct. 10, 2008, now Pat. No. 8,903,533.

(30) Foreign Application Priority Data

Oct. 10, 2007 (GB) .................................. 0719747.8

(51) Int. Cl.
*B29C 67/00* (2017.01)
*G05B 15/02* (2006.01)
(Continued)

(52) U.S. Cl.
CPC ............ *B33Y 50/00* (2014.12); *B29C 64/386* (2017.08); *B29C 64/40* (2017.08); *G05B 15/02* (2013.01);
(Continued)

(58) Field of Classification Search
CPC . B29C 67/00; B29C 67/0051; B29C 67/0088; B29C 67/00928; B29C 64/40;
(Continued)

(56) References Cited

U.S. PATENT DOCUMENTS 5,216,616 A * 6/1993 Masters .................. B29C 35/08
156/272.8
5,424,605 A * 6/1995 Lovoi ...................... H01J 3/022
313/422
(Continued)

FOREIGN PATENT DOCUMENTS

EP         1013407 A2 *  6/2000    ............. B29C 67/00
JP     H05-301293 A  * 11/1993    ............. B29C 67/00
(Continued)

OTHER PUBLICATIONS

Search Report from the UK Intellectual Property Office for British Patent Application No. GB-0719747.8 (dated Jan. 11, 2008).*
(Continued)

*Primary Examiner* — M. N. Von Buhr
(74) *Attorney, Agent, or Firm* — Patterson + Sheridan, LLP

(57) ABSTRACT

The present invention is directed to an improved method for supporting an object made by means of stereo lithography or any other rapid prototype production method. The generation of the support begins by determining the region that requires support in each layer of the object and defines a number of support points in this region. In a next step, a support mesh is generated connected to the object using these support points. The present invention also discloses different techniques that reduce superfluous edges to further optimize the support mesh. Finally, a support is generated from this support mesh. The present invention may facilitate the generation of supports data by employing more automation and less user analysis.

14 Claims, 12 Drawing Sheets

(51) Int. Cl.
| | |
|---|---|
| *B33Y 50/00* | (2015.01) |
| *G06T 17/10* | (2006.01) |
| *G06T 19/00* | (2011.01) |
| *B29C 64/386* | (2017.01) |
| *B29C 64/40* | (2017.01) |
| *B33Y 80/00* | (2015.01) |
| *B33Y 50/02* | (2015.01) |

(52) U.S. Cl.
CPC .............. *G06T 17/10* (2013.01); *G06T 19/00* (2013.01); *B33Y 50/02* (2014.12); *B33Y 80/00* (2014.12)

(58) Field of Classification Search
CPC ....... B29C 64/386; B33Y 50/00; B33Y 50/02; B33Y 80/00; G05B 15/02; G05B 2219/49013; G05B 2219/49038; G05B 2219/49039; G05B 2219/49041; B22F 3/008; G06T 17/10; G06T 19/00
See application file for complete search history.

(56) References Cited

U.S. PATENT DOCUMENTS

| | | | | |
|---|---|---|---|---|
| 5,595,703 | A * | 1/1997 | Swaelens | A61B 17/58 156/272.8 |
| 5,854,748 | A * | 12/1998 | Snead | B29C 67/0062 345/419 |
| 5,870,307 | A * | 2/1999 | Hull | B29C 67/0066 156/273.3 |
| 5,897,825 | A * | 4/1999 | Fruth | B29C 67/0066 264/308 |
| 5,943,235 | A * | 8/1999 | Earl | B29C 41/36 345/420 |
| 5,999,184 | A * | 12/1999 | Smalley | B29C 67/0092 345/419 |
| 6,021,358 | A * | 2/2000 | Sachs | G05B 19/40937 700/118 |
| 6,084,980 | A * | 7/2000 | Nguyen | B29C 67/0066 264/401 |
| 6,180,049 | B1 * | 1/2001 | Jang | B29C 67/0092 118/694 |
| 6,405,095 | B1 * | 6/2002 | Jang | B29C 67/0081 264/308 |
| 6,532,394 | B1 * | 3/2003 | Earl | B29C 41/36 219/121.62 |
| 6,558,606 | B1 * | 5/2003 | Kulkarni | B29C 64/40 264/401 |
| 6,797,351 | B2 * | 9/2004 | Kulkarni | B29C 64/40 428/43 |
| 7,077,638 | B2 * | 7/2006 | Leyden | B29C 41/12 425/174.4 |
| 7,403,833 | B2 * | 7/2008 | Heide | G06F 17/50 700/119 |
| 7,430,731 | B2 * | 9/2008 | Cohen | C25D 5/022 378/35 |
| 7,623,935 | B2 * | 11/2009 | Cohen | C25D 1/10 378/35 |
| 8,032,337 | B2 * | 10/2011 | Deichmann | A61F 11/08 345/419 |
| 8,246,673 | B2 * | 8/2012 | Golesworthy | A61B 17/12 623/1.13 |
| 8,285,411 | B2 * | 10/2012 | Hull | B29C 67/0092 264/177.17 |
| 8,585,576 | B2 * | 11/2013 | Arnal | A61B 17/06066 600/30 |
| 2002/0171177 | A1 * | 11/2002 | Kritchman | B29C 67/0059 264/401 |
| 2004/0006405 | A1 * | 1/2004 | Chen | G05B 19/4099 700/119 |
| 2004/0007470 | A1 * | 1/2004 | Smalley | B33Y 50/02 205/118 |
| 2004/0107080 | A1 * | 6/2004 | Deichmann | A61F 11/08 703/6 |
| 2004/0187714 | A1 * | 9/2004 | Napadensky | B29C 41/48 101/35 |
| 2005/0131570 | A1 * | 6/2005 | Jamalabad | B29C 67/0055 700/119 |
| 2007/0125601 | A1 * | 6/2007 | Lutze | B29C 43/203 182/222 |
| 2009/0072447 | A1 * | 3/2009 | Hull | B29C 67/0092 264/401 |
| 2010/0228369 | A1 * | 9/2010 | Eggers | G06T 17/10 700/98 |

FOREIGN PATENT DOCUMENTS

| | | | | |
|---|---|---|---|---|
| JP | 2001-009920 A | * | 1/2001 | ............. B29C 67/00 |
| JP | 2004-508222 A | * | 3/2004 | ............. B29C 67/00 |
| JP | 2007-062050 A | * | 3/2007 | ............. B29C 67/00 |
| WO | WO 97/11837 A1 | * | 4/1997 | ............. B29C 67/00 |

OTHER PUBLICATIONS

International Search Report and Written Opinion for Intellectual Application No. PCT/EP2008/063690 (dated Dec. 22, 2008).*
International Preliminary Report on Patentability for International Application No. PCT/EP2008/063690 (dated Apr. 22, 2010).*

* cited by examiner

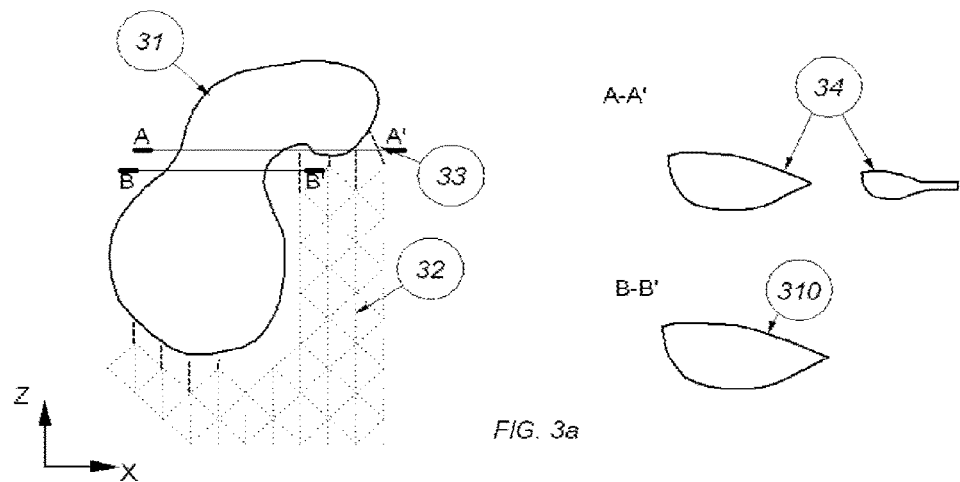
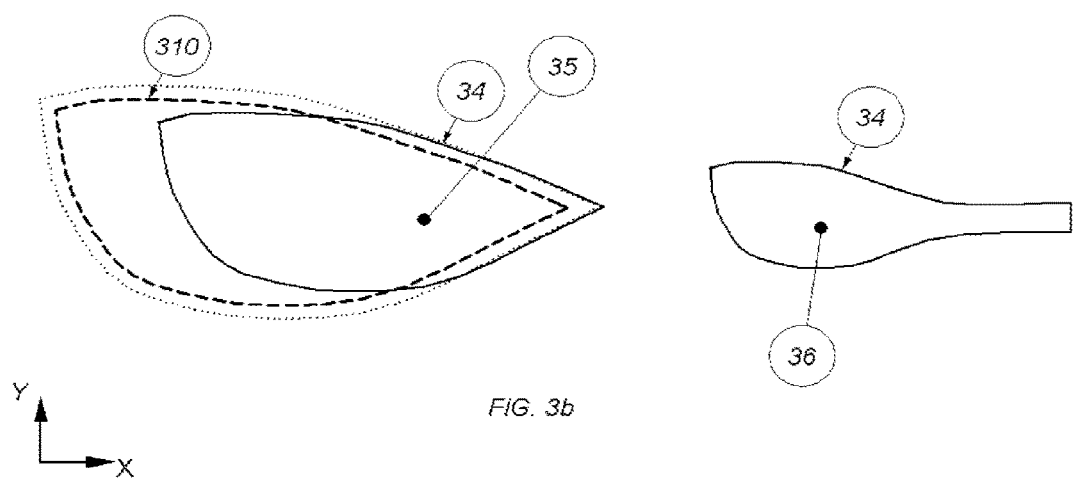
FIG. 3a
FIG. 3b

SUPPORT STRUCTURE FOR AN OBJECT MADE BY MEANS OF A RAPID PROTOTYPE PRODUCTION METHOD

CROSS-REFERENCE TO RELATED APPLICATIONS

This application is a continuation under 35 U.S.C. § 120 of U.S. patent application Ser. No. 12/682,488 (now issued U.S. Pat. No. 8,903,533), filed Apr. 9, 2010, which is the U.S. National Stage of International Application No. PCT/EP2008/063690, filed Oct. 10, 2008 and published in the English language in International Publication No. WO2009/047355 on Apr. 16, 2009, which claims priority to UK Patent Application No. GB0719747.8, filed Oct. 10, 2007. The entire contents of each of the aforementioned applications are hereby incorporated by reference.

BACKGROUND OF THE INVENTION

The present invention relates to methods for creating an object made by means of stereo lithography or another rapid prototype production method and, more particularly, is directed to an improved method for generating a support for an object made by means of stereo lithography or another rapid prototype production method. The present invention also relates to the support created by any of the above methods and to software adapted to carry out any of the above methods. The present invention also relates to a controller for controlling a rapid prototype production machine.

Rapid Prototyping and Manufacturing (RP&M) can be defined as a group of techniques used to quickly fabricate a scale model of an object typically using three-dimensional (3-D) computer aided design (CAD) data of the object. Currently, a multitude of Rapid Prototyping techniques is available, including stereo lithography (SLA), Selective Laser Sintering (SLS), Fused Deposition Modeling (FDM), foil-based techniques, etc.

A common feature of these techniques is that objects are typically built layer by layer. Stereo lithography, presently the most common RP&M technique, utilizes a vat of liquid photopolymer "resin" to build an object a layer at a time. On each layer, an electromagnetic ray, e.g. one or several laser beams which are computer-controlled, traces a specific pattern on the surface of the liquid resin that is defined by the two-dimensional cross-sections of the object to be formed. Exposure to the electromagnetic ray cures, or, solidifies the pattern traced on the resin and adheres it to the layer below. After a coat had been polymerized, the platform descends by a single layer thickness and a subsequent layer pattern is traced, adhering to the previous layer. A complete 3-D object is formed by this process.

Selective laser sintering (SLS) uses a high power laser or another focused heat source to sinter or weld small particles of plastic, metal, or ceramic powders into a mass representing the 3-dimensional object to be formed.

Fused deposition modeling (FDM) and related techniques make use of a temporary transition from a solid material to a liquid state, usually due to heating. The material is driven through an extrusion nozzle in a controlled way and deposited in the required place as described among others in U.S. Pat. No. 5,141,680.

Foil-based techniques fix coats to one another by means of gluing or photo polymerization or other techniques and cut the object from these coats or polymerize the object. Such a technique is described in U.S. Pat. No. 5,192,539.

For most RP&M techniques, it is necessary to anchor the object (i.e. the part) to a platform by means of a support to keep the object in place during the production process. These supports also prevent the object against deformations as it is being constructed. For example, stereo lithography resins have a tendency to deform during the building process because of internal stresses generated by shrinkage resulting in curling effects.

Once the production of the part is completed, it is necessary to manually separate the part from the temporal support. Preferably, this separation step requires a minimal effort and does not damage the surface or fine features of the object. To allow an easy removal of the support, it is already known that providing the walls with notches at the top and/or the bottom restrict the contact with the object and make it easier to remove the support.

Moreover as the support is removed once the object is built, the support is considered as lost material. It is therefore preferred to minimize the time, energy and amount of material required to build the support. Techniques to lower the material cost of the support are, for example, described in U.S. Pat. No. 5,595,703. On the other hand, the supports needs to maintain a sufficiently large structural strength to accommodate for the forces acting during part construction, e.g., gravitational, tensile, etc.

Typically RP&M techniques start from a digital representation of the 3-D object to be formed. Generally, the digital is sliced into a series of cross-sectional layers which can be overlaid to form the object as a whole. The RP&M apparatus uses this data for building the object on a layer-by-layer basis. The cross-sectional data representing the layer data of the 3-D object may be generated using a computer system and computer aided design and manufacturing (CAD/CAM) software. In this case, the support can be created by the CAD system as well. However, as this tends to be a tedious and labor intensive task, software has been developed in the past to automatically design the support structures and transcribe them in STL or any other surface format which gives a description of the special structure. Prior to designing the support, it is preferred to convert the 3-D CAD model into layers. One of the advantages to this approach is that a technique well known to those skilled in the art as beam width compensation may be applied to the generated slices. As this technique converts the layers into a geometry that corresponds more to the layers built by the production system, it typically results in a more accurate support. A software tool named the Contour Support generator (CSUP), as developed by Materialise N.V., Leuven, Belgium, is a first example of a tool that automatically designs a support structures based on the layer data of the object to be formed. Another method for automatic support generation is disclosed in patent application U.S. Pat. No. 5,943,235.

One of the disadvantages of the above-mentioned software tools is that often, the designed support does not sufficiently support at least one region of the object. Consequently, it is often required to verify the generated support and add extra support manually where needed. As mentioned earlier, this is a tedious and labor intensive task. Accordingly, those skilled in the art of rapid prototyping and the like have long recognized the desirability for further improvement in a more rapid, reliable and automatic means which would facilitate the design of supports to overcome the disadvantages of the prior art.

SUMMARY

In view of the above-mentioned disadvantages, it is an object of the present invention to provide an improved method and apparatus for supporting an object made by means of stereo lithography or any other rapid prototype production method. An advantage of the present invention can be that it employs more automation and less user analysis of the design of the support to be built.

Another advantage of some embodiments of the present invention is to lower the material cost and production time of the support.

The present invention discloses a method of generating data descriptive of a support structure for a three-dimensional object to be formed on a layer-by-layer basis using a computing device having a processor and a memory, comprising the steps of: providing an object layer data descriptive describing each layer of the object; defining for each layer of the object the region that requires support as well as a number of support points in the region that are to be connected to the support; defining the support mesh as the Boolean difference of a 3-D initial mesh, which fills up the envelope of the rapid prototyping system, and the object; connecting the support points of the object to the support mesh; and generating support data by transforming the support mesh into a support structure.

In preferred embodiments, the support region of a layer of the object may be obtained by Boolean subtracting the underlying layer of the layer from the layer. The underlying layer may be outward offset to account for the self-supporting capacity of the layer. The support region obtained this way may be further divided into a coarse and detailed support region. In case of a coarse support region, support points may be uniformly distributed on an inward offset boundary, such that the distance between neighboring points never exceeds a predefined distance. This distance may be defined as twice the critical overhang. The region obtained by Boolean subtracting circles (or regular polygons) centered around each of the support points on the boundary with a radius preferably set to be equal to the critical overhang from the coarse region, is then divided into a coarse and a detailed region. The support points in these regions are then further recursively defined. In case of a detailed support region, support points may be uniformly distributed on the skeleton of the detailed support region.

In preferred embodiments, at least a portion of the initial mesh may be regular. More preferably, the 3-D mesh may consist of vertical walls based on a rhombus pattern, including the vertical diagonal of the rhombus, whereby parallel walls are placed at half the width of the rhombus and orthogonal walls intersect at the horizontal diagonal of any rhombus.

In certain embodiments, prior to Boolean subtracting the 3-D object from the initial mesh, the boundary of the 3-D object may be offset outward to facilitate separating the support from the object.

It is another aspect of the present invention to provide a method to minimize the support material cost.

In preferred embodiments, superfluous edges of the support mesh may be removed by multiple downward or upward diverging processes, marking only those edges of the mesh that are used. Furthermore, introducing a ranking of nodes, a reduction of edges may be obtained by transforming the mesh into "vertical" or "shortest distance" columnar shaped meshes. Both mesh types may be merged or a preferred mesh type may be chosen instead. A further reduction of the mesh edges may be obtained by transforming at least part of the mesh structure into a more coarse grained structure.

In preferred embodiments, the support may be obtained by replacing the edges of the mesh as well as the connections between the mesh and the object by bars.

The present invention also includes an apparatus for designing a support comprising: a computing device having a processor and a memory; means for receiving object layer data describing each layer of the object; means for defining for each layer of the object the region that requires support as well as a number of support points in the region that are to be connected to the support; means for defining the support mesh as the Boolean difference of a 3-D initial mesh, which fills up the envelope of the rapid prototyping system, and the object; means for connecting the support points of the object to the support mesh; means for generating support data by transforming the support mesh into a support structure; and means for outputting a digital description of the design of the support.

The apparatus can include means for, prior to Boolean subtracting the 3-D object from the initial mesh, applying an outward offset on the boundary of the 3-D object, to facilitate separating the support from the object.

The apparatus can also include means for minimizing the support material cost, i.e. means to remove superfluous edges from the support mesh.

The means for minimizing the material cost can include means for removing superfluous edges using downward or upward diverging processes; or means for transforming at least part of the mesh structure into a more coarse grained structure; or means for transforming the support into columnar shaped meshes. The means to transform the support into columnar shaped structures can include means to define a rank for each node of the support mesh and can include a means to transform the support mesh into a "vertical" or "shortest distance" columnar structure or a combination thereof based upon the ranking of each node of the support mesh.

The present invention also provides a computer program product comprising code segments, the code segments comprising, when executed on a computing device: means for receiving object layer data describing each layer of the object; means for defining for each layer of the object the region that requires support as well as a number of support points in the region that are to be connected to the support; means for defining the support mesh as the Boolean difference of a 3-D initial mesh, which fills up the envelope of the rapid prototyping system, and the object; means for connecting the support points of the object to the support mesh; and means for generating support data by transforming the support mesh into a support structure.

The computer program product can comprise means to carry out any of the methods of the present invention. The present invention also includes a machine readable storage medium storing the computer program product.

Further aspects, objects, benefits and features of the invention will become apparent from the following detailed description and drawings which disclose the invention. The description is given merely as an example and does not limit the scope of the protection claimed. The reference numbers below relate to the appended figures.

BRIEF DESCRIPTION OF THE DRAWINGS

FIG. 3a-c illustrates the coarse and detailed region inside an unsupported region.

DETAILED DESCRIPTION OF CERTAIN INVENTIVE EMBODIMENTS

Figure 1:
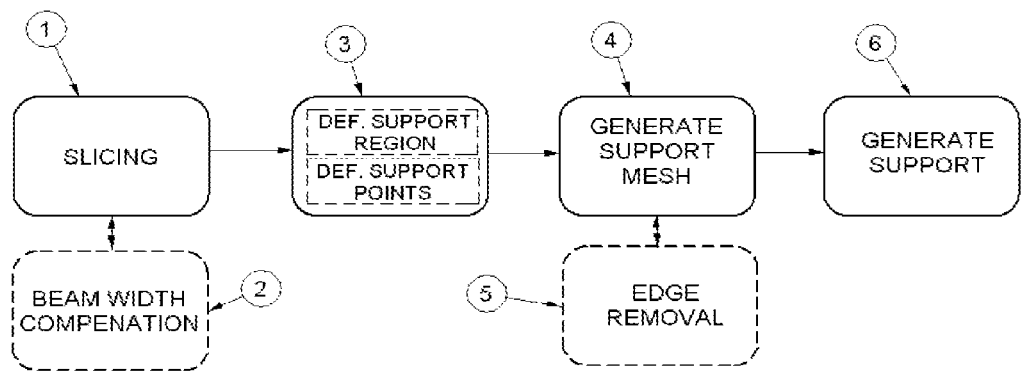
FIG. 1 is a block diagram of a preferred embodiment.

In the following detailed description of the preferred embodiments, reference is made to the accompanying drawings, which form a part hereof, and within which are shown by way of illustration specific embodiments by which the invention may be practiced. The drawings described are only schematic and are non-limiting. In the drawings, the size of some of the elements may be exaggerated and not drawn on scale for illustrative purposes. It is to be understood that other embodiments may be utilized and structural changes may be made without departing from the scope of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The present invention relates to methods for creating an object made by means of stereo lithography or another rapid prototype production method and, more particularly, is directed to an improved method for generating a support for an object made by means of stereo lithography or another rapid prototype production method. Any suitable method of designing the support may be used. A preferred process for designing the support uses object layer data describing each layer of the object as an input, e.g. ".SLI" or ".SLC" as used by 3D Systems apparatuses, ".SSL" as used by Stratasys apparatuses, or ".CLI" as used by Eos apparatuses. Preferably, a technique known in the field as beam width compensation is applied to the input slice data. Beam width compensation is a technique that makes adjustments to the border of the sliced layer to account for the size of the beam width. If the width of the beam is not accounted for, the final built part will be distorted from the original by as much as 1 full beam width. As the compensated sliced data corresponds more to the dimensions of the built 3-D object, it is expected that applying this technique increases the accuracy of the designed support.

Alternatively, a standard 3D file format may be provided as an input file format. The computer system may also convert the image of 3-D object into a proper format utilizing commercially available CAD software including MAGICS RP from Materialise N.V., Leuven, Belgium. A commonly used format is the stereo lithography file (e.g. ".STL"). In this case, the preferred process starts by using a slicing process to slice the 3-D model into horizontal layers. Various techniques known in the field of rapid prototyping may be used to perform this process. A useful textbook on software for rapid prototyping software is "Software Solutions for Rapid Prototyping", ed. Ian Gibson, Professional Engineering Publishing Ltd., Cromwell Press, 2002.

Referring now to the drawings, and particularly to FIG. 1, there is shown a block diagram that illustrates a preferred embodiment for generating data for the support. As shown on FIG. 1, the sliced data (obtained by any means—not necessarily as shown in FIG. 1 but preferably beam width compensated) is input to module 3 which defines for each individual layer that region that requires support, referred to as the "support" region, and a set of support points located in this region where the object will be connected to the support. The support region may be defined by examining which part of the layer is not supported by an underlying layer by means of Boolean operations, i.e. the region of a layer that requires support may be obtained by subtracting the underlying layer of the layer from the layer. The support region of the first layer is equal to that region described by the first layer. It is clear that for other layers, the support region does not necessarily track the boundary of the part.

Figure 2:
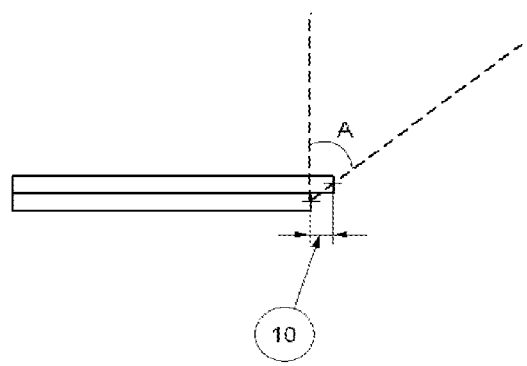
FIG. 2 is an X-Z projection of a 3-D model illustrating the object, support and support connection.

Preferably, an outward offset is applied to the underlying layer to account for the self-supporting ability of the layer. Indeed, a layer generally only requires a support if the overhang, illustrated by numeral 10 on FIG. 2, of this layer exceeds a critical overhang, i.e. the self-supporting capacity of a layer. The self-supporting capacity is dependent on e.g. the layer thickness, material properties, operating temperature, etc. This critical overhang may also be defined in terms of an overhang angle. When the overhang angle, angle A in FIG. 2, exceeds a critical overhang angle, for example 30 degrees away from the vertical axis, the layer is no longer self-supporting and a support is required. The critical overhang angle may be defined for each individual layer or a set of layers. Layers belonging to a part of the object that requires a higher surface quality but less accuracy typically have fewer connections to the support, as separating the support from the built object derogates fine features less. Increasing the critical overhang angle results in smaller support regions and therefore fewer connections to the support are required.

Figure 3C:
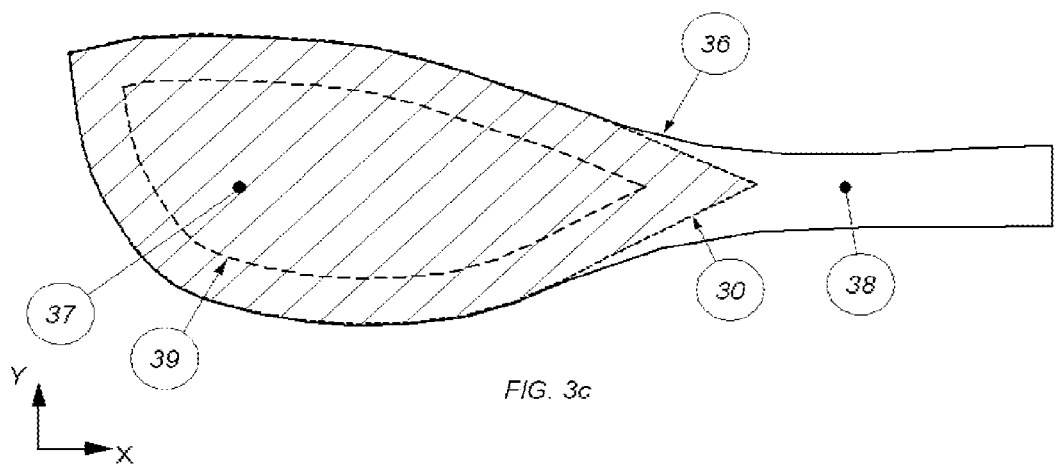

In accordance with an embodiment of the present invention, in case at least a portion of the object layer requires support, a set of "support" points are defined distributed, preferably uniformly distributed inside the support region from which a connection can be made with the support. A preferred process according to an embodiment of the present invention to define these support points recursively, is now described. FIG. 3a illustrates a 3-D object 31 connected to a support 32 by means of support connection 33. FIG. 3b illustrates the cross-sectional view (in the X-V plane) for a given layer 34, also illustrated with numeral 34 on FIG. 3a, with a region 35 that is supported by an underlying layer 310, also illustrated with numeral 310 on FIG. 3a, and a region 36 that requires support. In a preferred embodiment, illustrated in FIG. 3c, the unsupported region 36 is divided into a "coarse" region 37 and a "detailed" region 38. The coarse region may be defined as follows: first, the boundary of the unsupported region 36 is offset inwards to produce an offset boundary 39. Then, boundary 39 is offset outwards by an identical value to produce boundary 30. This boundary defines the coarse region 37. The detailed region 38 is then defined as the Boolean difference from the support region 36 and the coarse region 37. Once the coarse and detailed regions have been defined, the set of support points can be defined.

Figure 4:
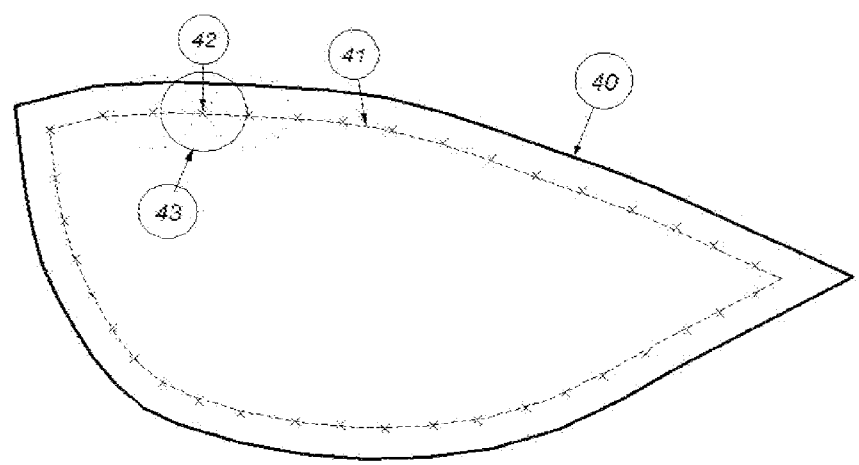
FIG. 4 illustrates the process that determines the support points inside a coarse region.

A preferred process to define the support points for a coarse region according to an embodiment of the present invention is now described according to FIG. 4. First, the boundary of the coarse region 40 is offset inwards by a distance d1 to produce an offset boundary 41. Preferably the distance d1 is smaller than the critical overhang of the layer as described earlier. Support points 42 are then distributed, preferably uniformly distributed on boundary 41. The number of support points 42 on boundary 41 is chosen such that the distance d3 between two neighboring points is limited by a maximum distance dMAX. Preferably, the maximum distance dMAX is smaller than twice the critical overhang of the layer. In a next step, circles 43 (or regular polygons) are defined for each support point 42 on boundary 41. Preferably, the radius of this circle is set to be equal to the critical overhang. The region defined by Boolean subtracting all these circles from the coarse region 40, is then divided into a coarse and a detailed region as described earlier. The support points in the coarse and detailed region are then further recursively defined as described in this and the following section.

Figure 5:
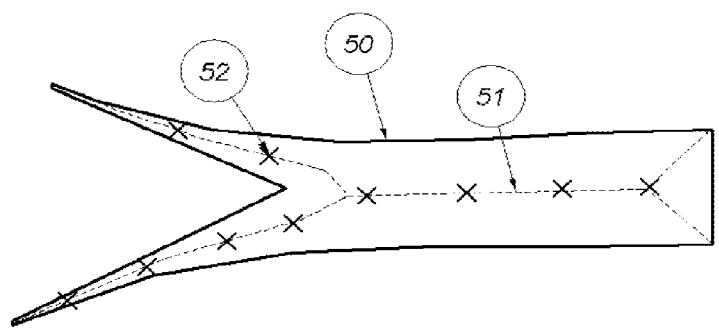
FIG. 5 illustrates the process that determines the support points inside a detailed region.
Figure 6:
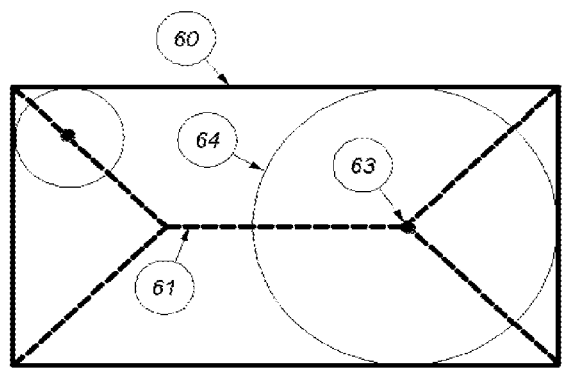
FIG. 6 shows a rectangle and its skeleton with some inscribed discs.

In an embodiment of the present invention, to define the support points in a detailed region, the following preferred process can be used, as illustrated in FIG. 5. First, the skeleton 51 of the detailed region 50 is determined. To clarify the meaning of the skeleton 51 a schematic skeleton will be described with reference to FIG. 6. The skeleton 61, as shown on FIG. 6, of a region 60 is defined as the locus of the centers 63 of all maximal inscribed hyper-spheres 64 (I.e., discs and balls in 2D and 3D, respectively). It should be noted that an inscribed hyper-sphere is maximal if it is not covered by any other inscribed hyper-sphere. The skeleton may be defined by calculating the Voronoi diagram generated by the boundary points. The Voronoi diagram of a discrete set of points is the partition of the given space into cells so that each cell contains exactly one boundary point and the locus of all points which are closer to this boundary point than to other boundary points. If the density of boundary points goes to infinity then the corresponding Voronoi diagram converges to the skeleton. Returning to FIG. 5, support points 52 are then uniformly distributed on skeleton 51. The number of support points 52 on skeleton 51 is chosen such that the distance d3 between neighboring points is limited by a maximum distance dMAX. Preferably, the maximum distance dMAX is smaller than twice the critical overhang of the layer. Other methods to define support points are included within the scope of the present invention and are not necessarily based on a distinction between a coarse and detailed region of the support region.

This process then repeats until the computations for all the layers have been completed. At the end of the process, all points where support is required to build the 3-D object are defined. The location of these support points is then input in a following module, shown in FIG. 1 as module 4, which designs the 3-D support mesh. In another preferred process, the calculation of support points may be refined once the support mesh has been designed using the support mesh as an input in order to assign additional or remove superfluous support points followed by a refinement of the support mesh. A preferred process to create the support mesh is now described in accordance with an embodiment of the present invention.

First, a mesh is generated inside the envelope of the rapid prototyping system to which is referred as the initial mesh. The envelope of the RP system is defined as the region in which the 3-D object is built. In a preferred embodiment, at least a portion of the initial mesh is a regular 3-D mesh. Moreover, multiple regular meshes may be used, each defining at least a portion of the initial mesh. In another preferred embodiment, the mesh is built in the shape of standing walls in a rhombus pattern and connected to one another according to a grid. Other patterns such as e.g. described in U.S. Pat. No. 5,595,703 may also be used. Independently of which pattern is used, edges are defined. The edges may be vertical edges. Two edges may be connected by a node.

Figure 7A:
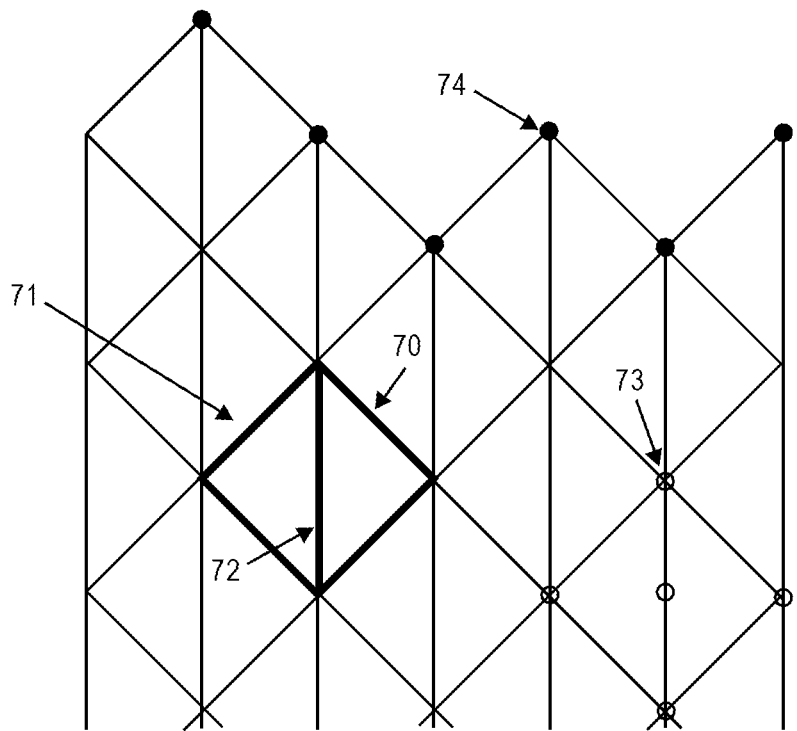
FIG. 7a-b shows a a) 2-D and b) 3-D representation of the preferred initial mesh.
Figure 7B:
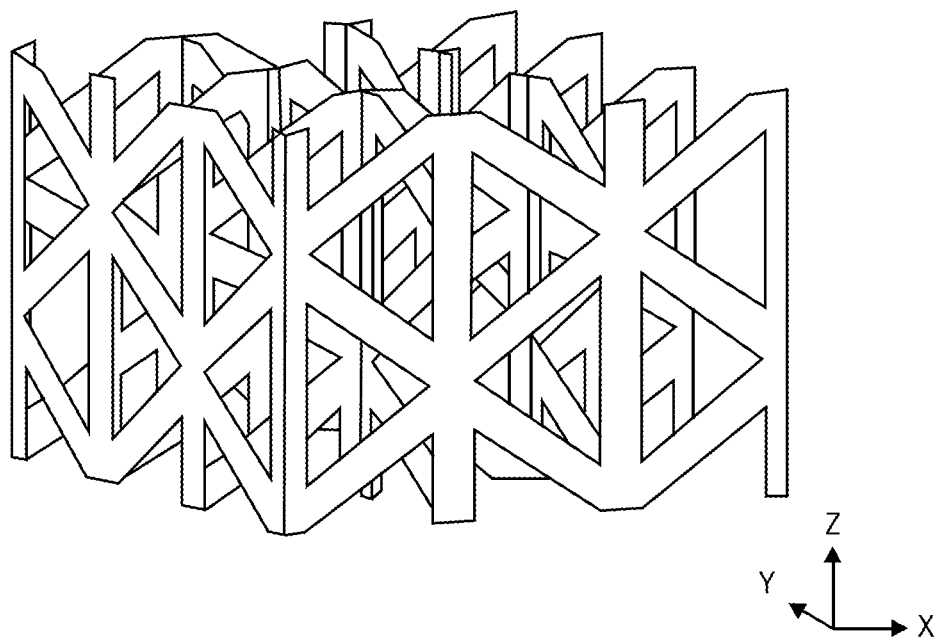

If a rhombus is used, the vertical edges are shown with numeral 72. The vertical diagonal of the rhombus, consisting out of 2 equally sized edges, may also be added to the pattern to increase the connectivity to the object. Edges 70 of the rhombus 71 as well as the vertical edges 72, as shown on FIG. 7a, are considered to be the smallest working entity, i.e. these entities can be part of the mesh or can be removed from it. Two or more edges 70 are connected by a node. Nodes may be further categorized into boundary nodes 74 and hidden nodes 73. Orthogonal walls may be positioned such that each rhombus of the first wall intersects with a rhombus of the second wall having the vertical diagonal in common. The spacing between parallel walls may be set to the width of the horizontal diagonal of the rhombus. Moreover, the resulting mesh may be duplicated and offset half the size of the horizontal diagonal of the rhombus along the X and Y direction. A 3-D impression of the preferred mesh is given in FIG. 7b.

Once the initial mesh is generated, the 3-D model is connected to it. In a preferred process according to an embodiment of the present invention, all layers of the 3-D object are first Boolean subtracted from the initial mesh to form the "support" mesh. Optionally, prior to subtracting the object layer from the initial mesh, the boundary of the 3-D object may be outward offset on a layer basis to introduce spacing between the support mesh and the object. This spacing can be advantageous when separating the support from the object. During this process, new boundary nodes may be created.

In a next step, the object is attached to the support mesh by connecting each support point of the object to the closest node of the support mesh by means of what is referred to as a "connection" edge. Preferably, support points are only connected to closest boundary nodes. Due to the nature of the rapid prototyping building process, only downward oriented connections to the mesh are considered. "Downwardly" refers to the Earth's gravitational field. Multiple connection edges for each mesh node may be defined. In case no connection edge can be created, the support point may be connected to the object itself. Preferably, in this case the connection is made along one of the directions of the mesh edges. More preferably, a vertical, downward connection edge is made.

Once all support points are connected either to the support mesh or to the object itself, superfluous edges of the support mesh may be removed to lower the material cost and production time of the object. Multiple processes to remove superfluous edges are included within the scope of the present invention.

Figure 8:
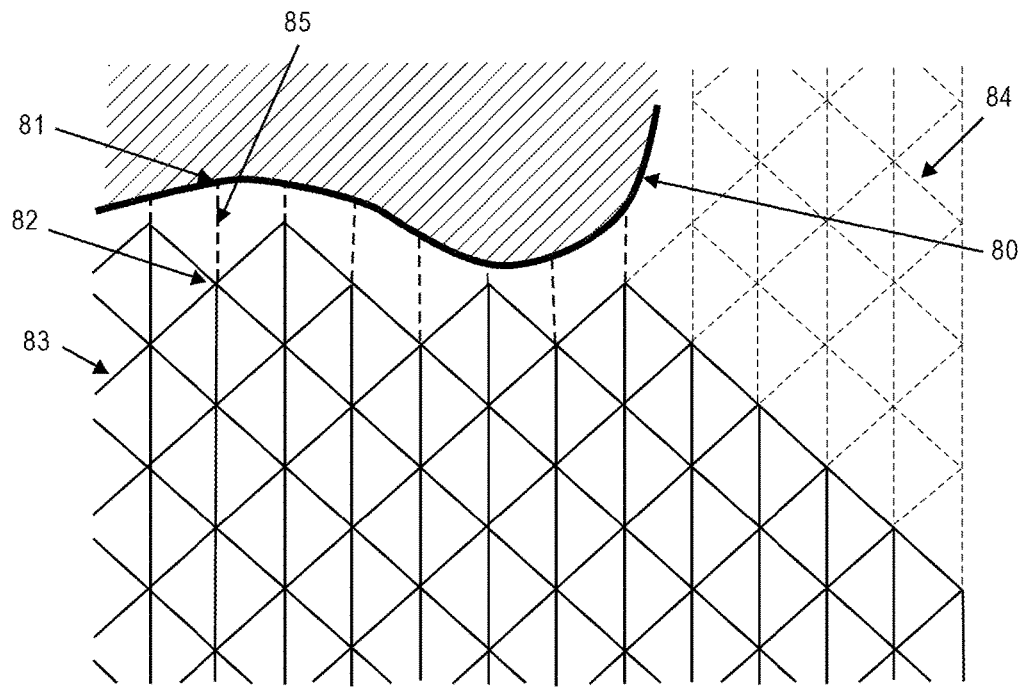
FIG. 8 illustrates the downward diverging process that determines the superfluous edges to be removed from the mesh.

In a first preferred process according to an embodiment of the present invention, removal of superfluous edges may be done by means of a downward diverging process, as illustrated in FIG. 8. Starting from support point 81 of object 80 ("root" node of the tree), each edge 83 that is part of the tree when traversing downward into the support mesh, is marked as a child edge. This process is repeated for each support point. Edges 84 that are not marked as child edges may then be removed from the support mesh. Similarly, an upward diverging process, traversing upward instead of downward, may be used e.g. starting from the nodes that connect the support mesh to the platform of the prototyping system.

In another preferred process according to an embodiment of the present invention, the support mesh, which is typically chosen to be very dense, may be transformed into a more coarse grained, airy structure. More preferable, the "granularity" of the mesh coarsens gradually when traversing downward, starting from the nodes connected to the support points as described in U.S. Pat. No. 5,595,703 (especially FIG. 12) which is incorporated herein by reference.

Figure 9:
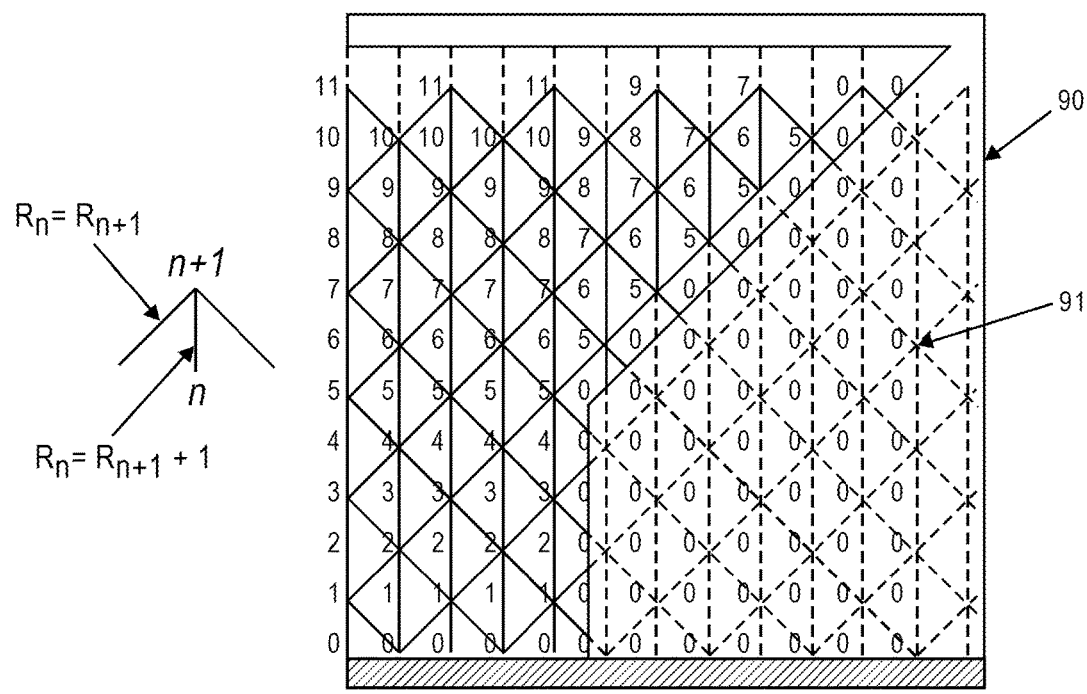
FIG. 9 illustrates the process to rank the nodes of the initial mesh.

In yet another preferred process according to an embodiment of the present invention, removal of superfluous edges of the support mesh may be done based on a ranking mechanism, as illustrated in FIG. 9. Each node of the initial mesh is ranked. The rank R of an "external" node 91 located inside object 90, or the rank of a node at or in the platform is given a rank zero. The node rank increases when traversing upwards on a vertical edge but is preserved when traversing upwards on an inclined edge. In case multiple rankings are possible for a specific node, e.g. a vertical edge increases the rank from R to R+1, but an inclined edge connected to the same node preserves rank R, the highest rank is chosen.

Figure 10:
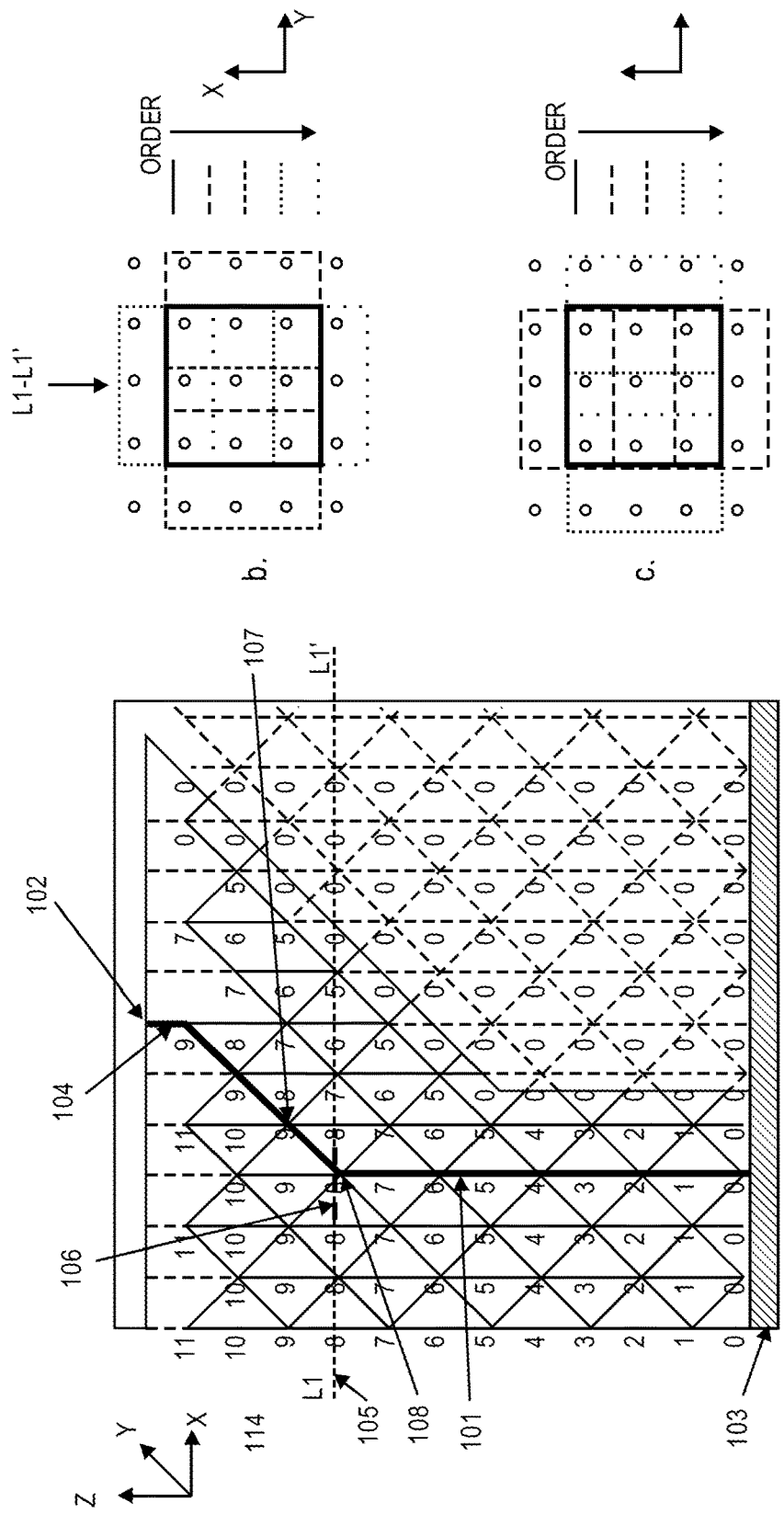
FIG. 10 illustrates the preferred path connecting a support point of the object with the platform for the case of a vertical columnar mesh.

In one preferred embodiment according to FIG. 10, the above-described ranking mechanism may be used to define a path 101, connecting a support point 102 of the object 100 with the platform 103. However, other ranking mechanisms may also be suitable. Columnar meshes may then be defined around this path. Edges that are not part of these columnar meshes may then be removed from the support mesh. Two preferred embodiments that define such columnar meshes are now described.

A preferred embodiment is illustrated in FIG. 10 and is referred to as the "vertical" columnar mesh. Plane 105 defines a grid of nodes, resulting from the use of a regular mesh structure, with a spacing along the x and y direction equal to half the length of the horizontal diagonal of the rhombus. Each node in this node plane that is connected to the source node 107 by means of an edge defines a target node, e.g. node 108. Each of these target nodes may define a square of nodes, such as e.g. square 106. The square 106 defined by target node 108 may be centered on the target node. The size of the square of nodes is a predefined setting that is related e.g. to the size of the rhombus. Preferably, the square defines a 3×3 node array. The sum of the rankings of nodes enclosed by each of these squares defines the square ranking. The edge leading to the target node with the highest square ranking is added to the preferred path. The target node with the highest square ranking is then set to be the new source node. In case multiple edges lead to the same, highest square ranking, preference is given to the edge with the highest square order. The square order may be defined as illustrated by the legend as shown in FIG. 10b. Moreover, the order of squares may be alternated with that defined in FIG. 10c for subsequent layers where the multiple nodes have the same highest order. The square having the highest rank and the highest order, referred to as the "optimal" square, may then also be used to mark the edges that form the columnar structure. The size of this optimal square may be altered in this step as it is related to the width of columnar structures to be formed. Moreover, the size of the optimal square may vary subsequent layers. Preferably, the size of the square is increased when traversing downwards. The broadening of the columnar structure induced this way may be defined by a predefined height/width ratio. The edges that are connected to those nodes that are part of the support mesh and are enclosed by the optimal square are marked. This process then repeats until the square ranking reaches a value zero, i.e. the platform is reached, or until all edges connected to the source nodes are found to intersect with the object. The process is then repeated for each support point, after which only those edges that are marked during this process as being part of the columnar structure are kept in the vertical columnar mesh.

An upward diverging process starting from the platform nodes followed by a downward diverging process starting from the support points may further reduce superfluous edges in the mesh. The remaining mesh may resemble columnar structures connecting the support points with the platform, without making a connection to the object itself. A drawback of the vertical columnar mesh is that not all support points may be connected to the support mesh by means of columnar meshes.

Another preferred embodiment, referred to as the "shortest distance" columnar mesh, solves this disadvantage. This preferred embodiment, illustrated in FIG. 11, may resemble structures known by those skilled in the art as gussets. In contrast to the process described above, path 111 is now defined by following the lowest square rank instead of the highest one. Definition of the optimal squares 112 and the edges that are part of the columnar structure are defined in an identical way as for the vertical columnar mesh. Again, the process is repeated until platform 115 is reached or at least one edge connected to a node in the center of the optimal square is found to intersect with the object. In contrast to the vertical columnar mesh process, the shortest path mesh process allows additional connection edges 113 to be defined between the support mesh and the object. Each node of the columnar structure connected to at least one edge intersecting the object is marked as a "connection" node, i.e. a node that has to be connected to the object. A downward diverging process may precede the creation of connections from connection nodes to remove superfluous edges. The connection nodes that remain in the support mesh after the diverging process are then connected to the object. Preferably, the connection node is connected to the object using one of the edges of the initial mesh connected to the connection node and intersecting with the object. In case multiple intersecting edges are attached to the connection node, preference is given to vertical edge first. In case no vertical edge is connected to the connection node, the edge that results in the shortest connection is preferred. The point where the connection edge intersects with the object is referred to as the "connection" point. The process is then repeated for each support point, after which only those edges that are marked during this process as being part of the columnar structure are kept in the shortest distance mesh. An upward diverging process starting from connection points 114 as well as from the platform nodes 115 may then be used to remove superfluous edges from the shortest distance mesh. The shortest path mesh has the advantage that it provides support for each support point of the object. A drawback of this approach is that the number of connections made with the object is increased. As described earlier, this may increase the risk of damaging the surface or fine features when removing the support from the object. Other methods to remove superfluous edges based on a ranking mechanism are possible and do not necessarily need to be based on the ranking mechanism described earlier.

In yet another preferred embodiment, the vertical columnar mesh and shortest path mesh are combined. Preferably, for support points that are connected to both mesh types, only one mesh type is kept. More preferably, the columnar mesh is kept as this mesh type reduces the connections made to the object. Similar as described before, a downward diverging process, starting from the support points of the object followed by an upward diverging process starting from connection points as well as from platform nodes may be initiated to remove superfluous edges of the merged mesh structure.

Other preferred embodiments include combinations of the above-described process that may improve the speed of the overall process. For example, it may be advantageous to transform the mesh from a fine to coarse grained structure prior to forming additional connections as described in the shortest path process as the fine-to-coarse grain process may remove nodes that were marked to be connected to the object. It is clear that removing these nodes prior to making the connections improves the speed of the overall process.

Figure 12:
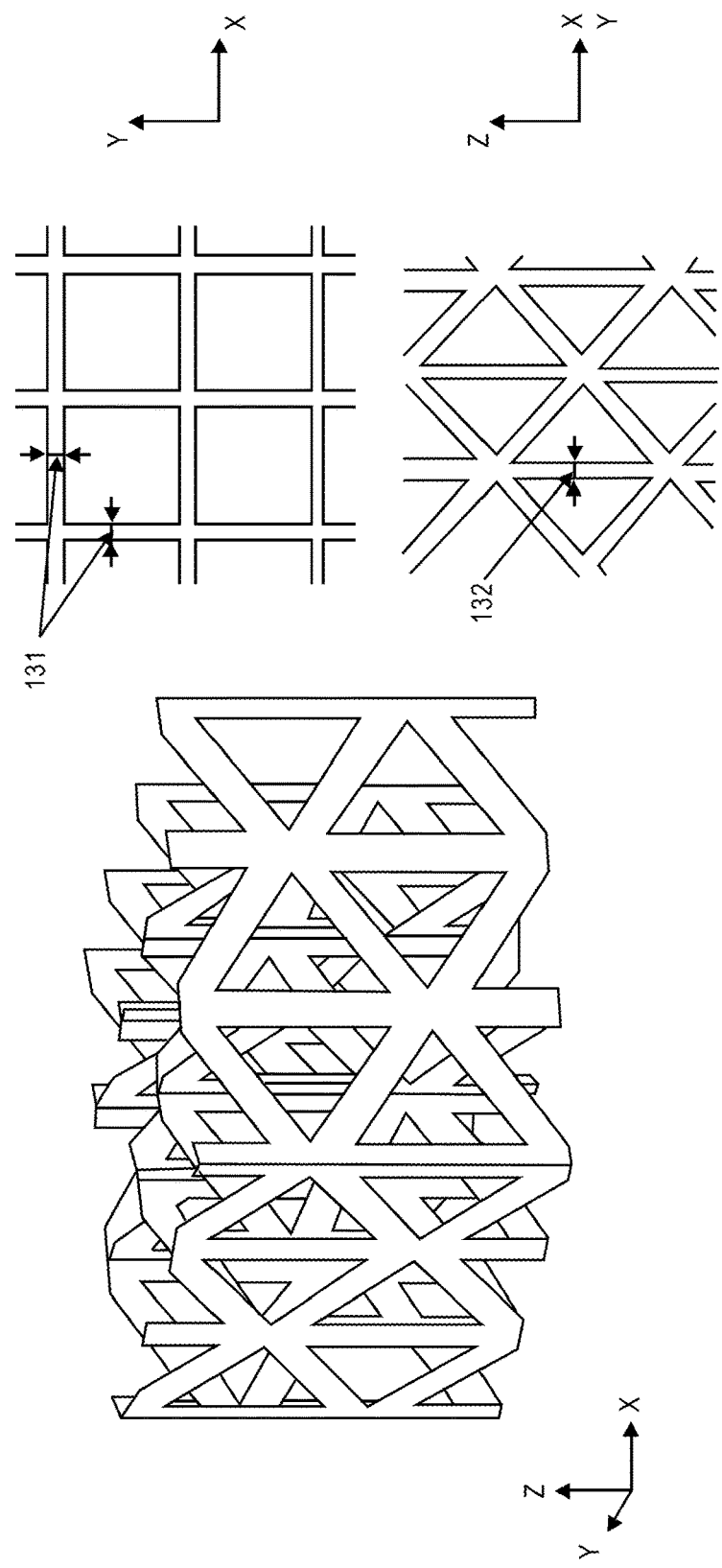
FIG. 12 illustrates a 3-D representation of the preferred support structure.

Finally, once the support mesh has been completed, it can be converted into a support structure, as illustrated by module 6 on FIG. 1. In one preferred embodiment, the edges of the mesh are converted into bar shaped structures such that the symmetry axis of the bar shaped structure coincides with the edge of the mesh. The width of the bars, as indicated by numeral 132 on FIG. 12, may vary inside the support. E.g. the width may increase depending on the length of the edge as longer bars typically need to be stronger and hence wider. Preferably, the thickness of the bar, as indicated by numeral 131 of the top view on FIG. 12, is chosen to be equal to the width of the laser beam, in case stereo lithography or SLS is considered as the RP&M technique, or the width of the nozzle in case FDM is considered. This may not only limit the size of the .SLI file, which contains start/stop locations for each layer, but also reduces the time needed to build the support. Other structures such as e.g. cylinders may also be used to replace the edges of the mesh.

Figure 13:
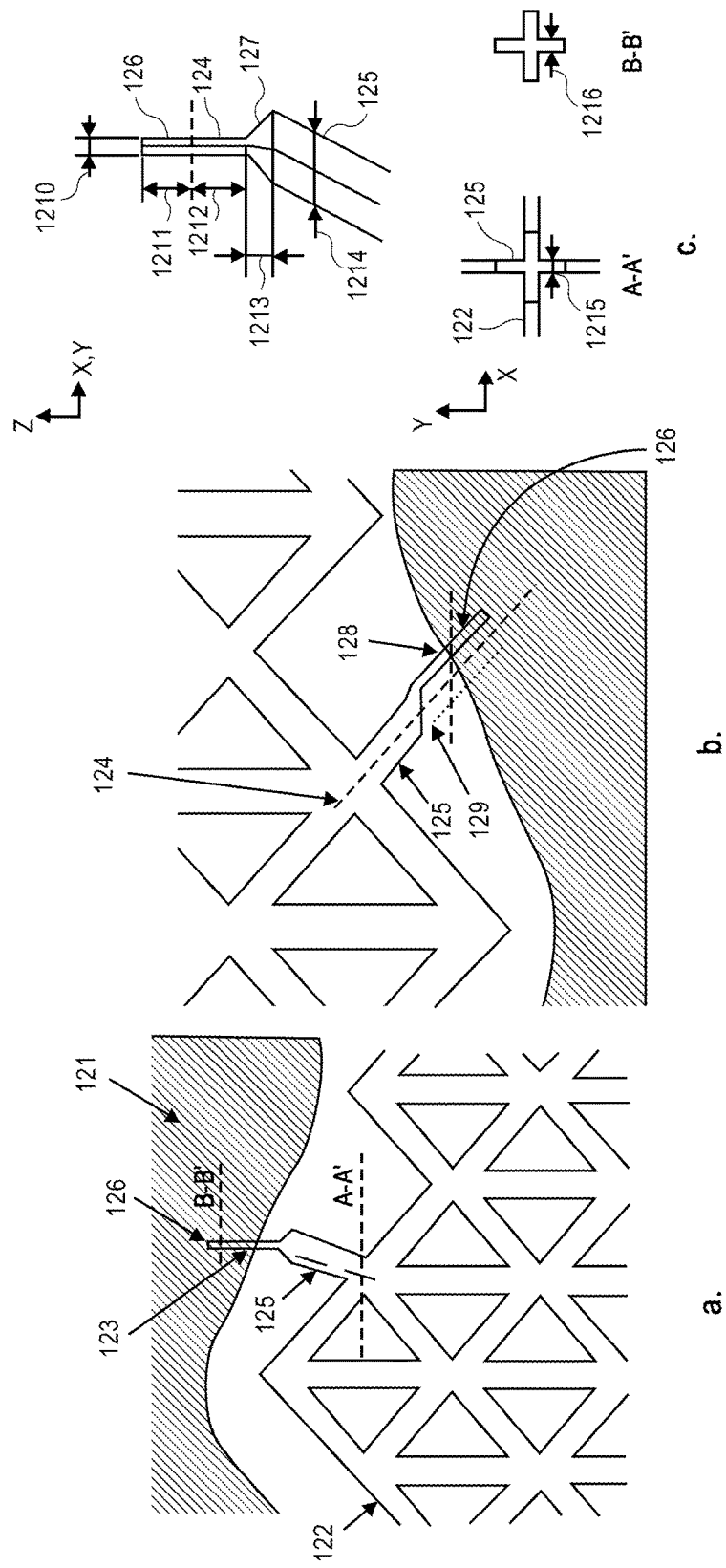
FIG. 13 illustrates preferred embodiments for the connection structures.
Figure 14:
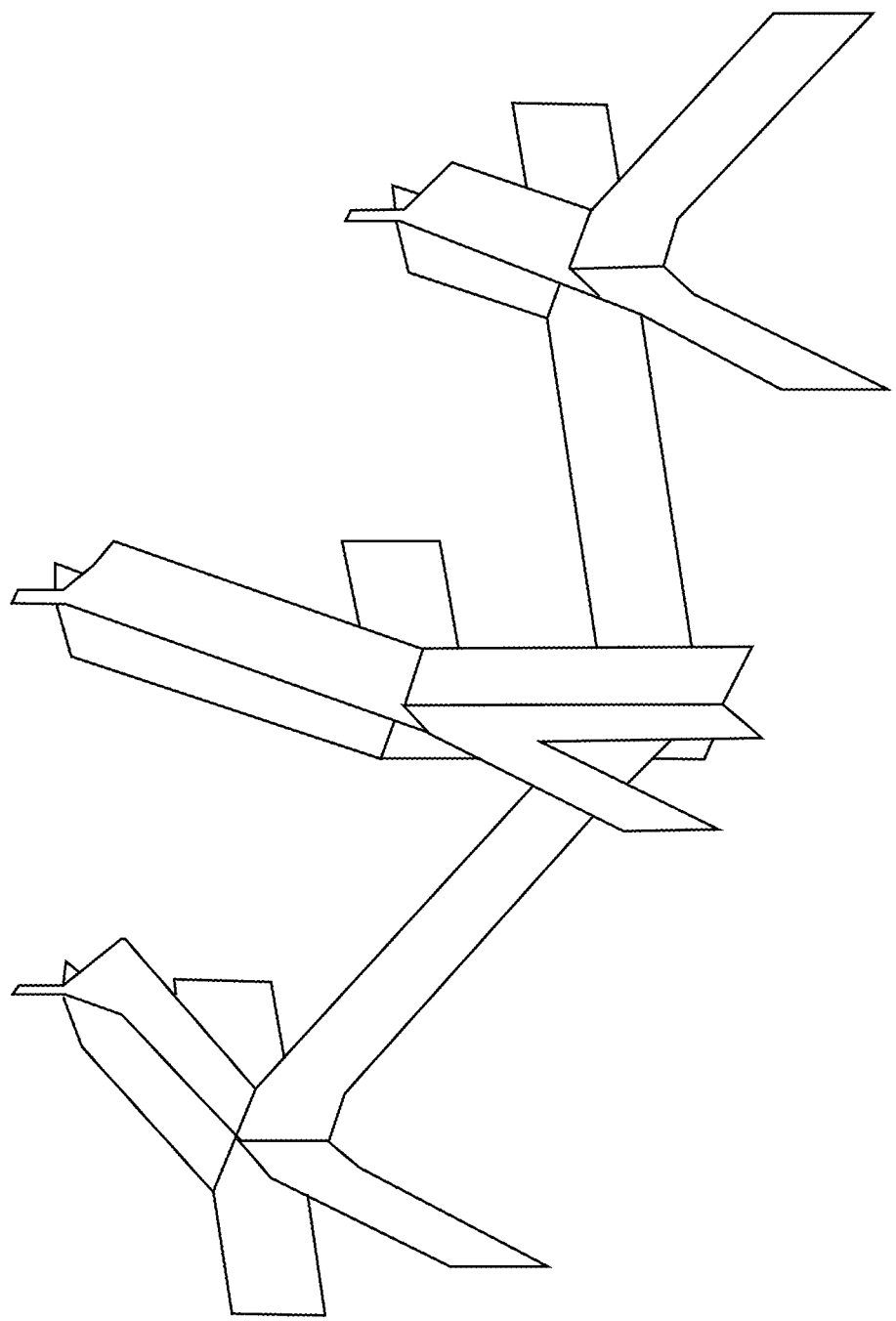
FIG. 14 illustrates a 3-D representation of the preferred connection structure.

In another preferred embodiment, the connection edges, connecting the support mesh with the 3-D object, may be converted into a connection structure as is now described according to FIG. 13*a*. Preferably, the connection structure consists of a bar shaped structure 126 whose symmetry axis intersects with the object at the location of the support point, a second bar shaped structure 125 and an intermediate region that connects structure 126 with structure 125 over a distance 1213. More preferably, the cross-section of bar shaped structures 126, 127 and 125 has the shape of cross with lines of equal length, as illustrated on FIG. 13*c*. Width 1210 of structure 126 may be chosen such that it allows an easy removal of the support from the object. Structure 126 may penetrate object 121 with a predefined distance 1211 to assure a good connection between object 121 and support 122. Preferably, distance 1211, 1213 and 1212 and width 1210 are kept constant for each connection made between the support mesh 122 and support point 123 giving each connection a similar strength. Width 1214 may be equal to the width of the support structure, as indicated by numeral 132 on FIG. 12. The thickness 1215 and 1216 of each line of the cross may set to be equal to the width of the laser beam to limit the size of the SLI file and to speed up the building process. The connection structure may be aligned to the support structure where the connection structure is attached to the support structure as indicated on FIG. 13*c* by cross-section A-A'. A 3-D illustration of the connection structure is given in FIG. 14. Other structures, such as e.g. cylinder, pyramids and cones, or combinations thereof may also be used to make a connection between the support mesh and the object.

Figure 11:
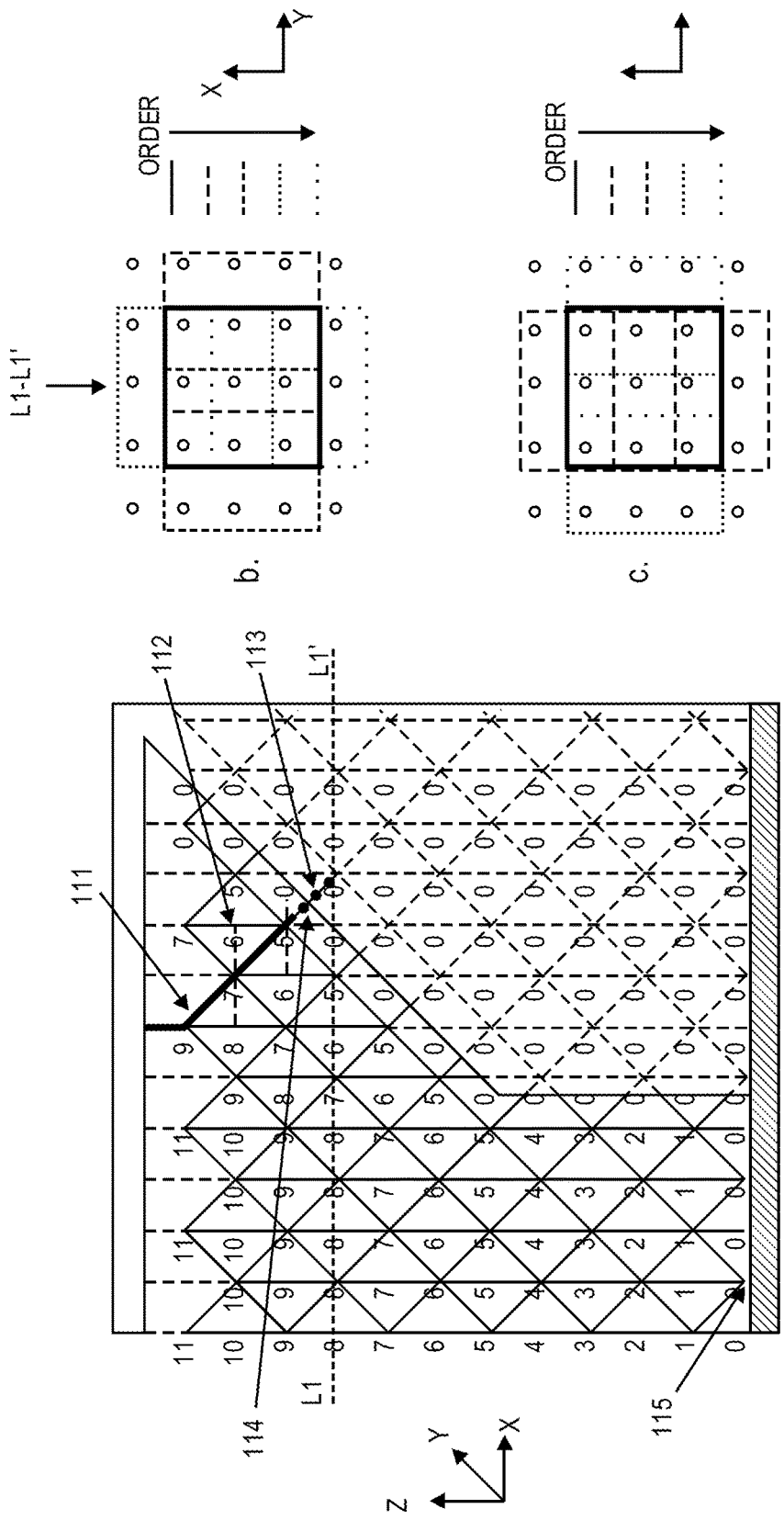
FIG. 11 illustrates the preferred path connecting a support point of the object with the platform or the object for the case of a shortest distance columnar mesh.

A preferred process according to an embodiment of the present invention to convert the additional connection edges 113 made between the support mesh and the object, e.g. connections 113 as illustrated on FIG. 11, differs from the previous process in that structure 125 has a symmetry axis that coincides with the connection edge 113 and structure 127 has a symmetry axis that is parallel to the connection edge 113, i.e. parallel to an edge of the mesh. Preferably, connection point 114 is also redefined. This may be done as follows: structure 125 is virtually prolonged, as indicated by numeral 129 on FIG. 13*B*, until it intersects with the object. The intersecting point that is closest to the support structure may be chosen as the new connection point.

Once all edges of the support mesh have been converted, the support may be transcribed in a sliced data format or any surface format which gives a description of the support structure.

Figure 15:
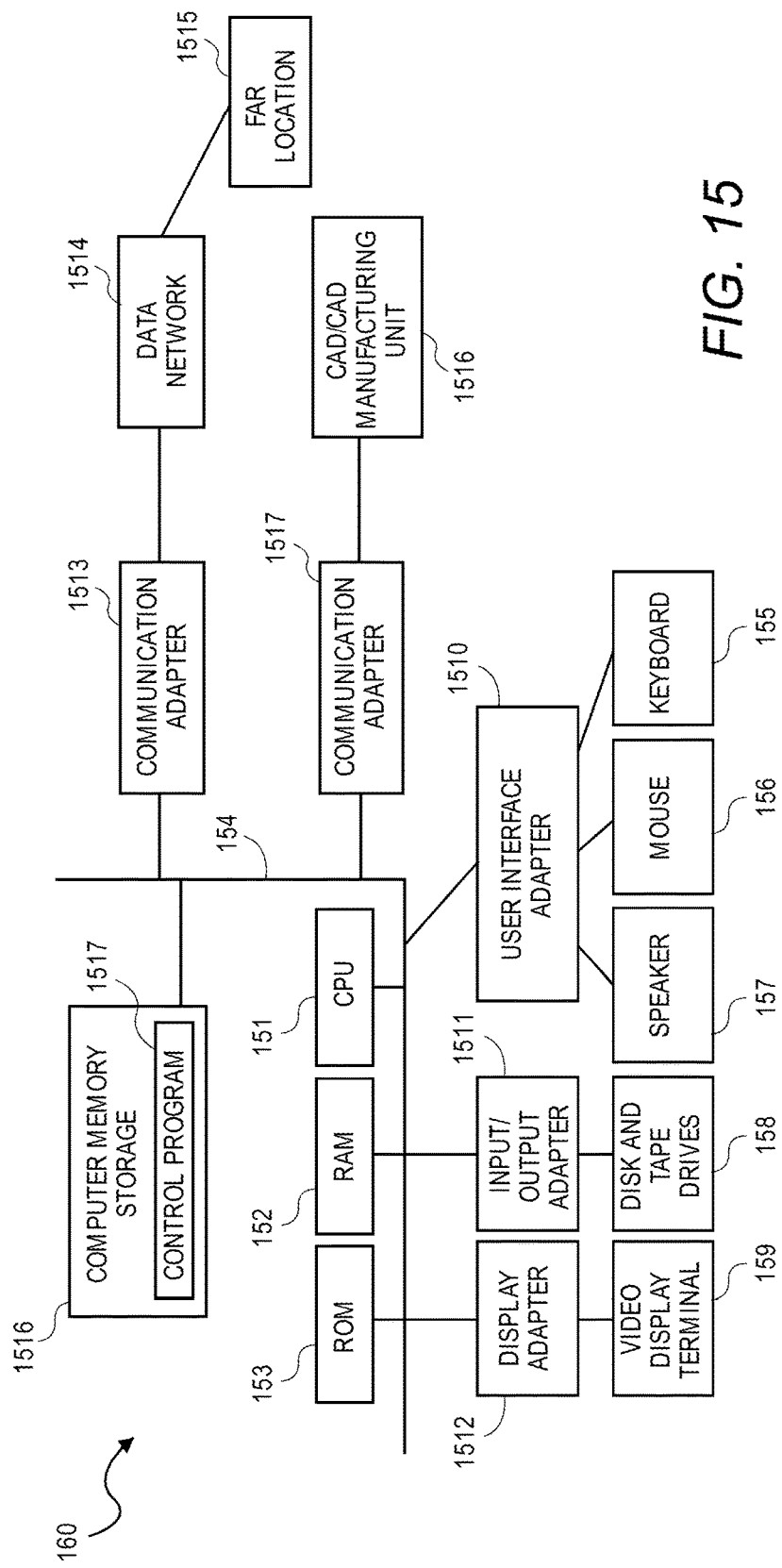
FIG. 15 is a schematic representation of a computer based apparatus for carrying out the methods according to embodiments of the present invention, including optional computer aided manufacturing.

FIG. 15 is a schematic representation of a computing system which can be utilized with the methods and in a system according to the present invention. A computer 150 is depicted which may include a video display terminal 159, a data input means such as a keyboard 155, and a graphic user interface indicating means such as a mouse 156. Computer 150 may be implemented as a general purpose computer, e.g. a UNIX workstation or a personal computer.

Computer 150 includes a Central Processing Unit ("CPU") 151, such as a conventional microprocessor of which a Pentium IV processor supplied by Intel Corp. USA is only an example, and a number of other units interconnected via bus system 154. The bus system 154 may be any suitable bus system—FIG. 15 is only schematic. The computer 150 includes at least one memory. Memory may include any of a variety of data storage devices known to the skilled person such as random-access memory ("RAM"), read-only memory ("ROM"), non-volatile read/write memory such as a hard disc as known to the skilled person. For example, computer 150 may further include random-access memory ("RAM") 152, read-only memory ("ROM") 153, as well as a display adapter 1512 for connecting system bus 154 to a video display terminal 159, and an optional input/output (1/0) adapter 1511 for connecting peripheral devices (e.g., disk and tape drives 158) to system bus 154. Video display terminal 159 can be the visual output of computer 150, which can be any suitable display device such as a CRT based video display well-known in the art of computer hardware. However, with a desk-top computer, a portable or a notebook-based computer, video display terminal 159 can be replaced with a LCD-based or a gas plasma-based flat-panel display. Computer 150 further includes user interface adapter 1510 for connecting a keyboard 155, mouse 156, and optional speaker 157. The relevant data describing the 3-D object to be formed may be input directly into the computer using the keyboard 155 or from storage devices such as 158, after which a processor carries out a method in accordance with the present invention. The results of the method may be transmitted to a further near or remote location, e.g. a CAD/CAM processing facility to manufacture the template in accordance with the details provided by computer 150.

A CAD/CAM manufacturing unit 1516 may also be connected via a communications adapter 1517 to bus 154 connecting computer 150 to a data network such as the Internet, an Intranet a Local or Wide Area network (LAN or WAN) or a CAN. The manufacturing unit 1516 may receive an output value or support descriptor file directly from computer 150 running a computer program for support design in accordance with the present invention or a value or descriptor file derived from such an output of computer 150. Alternatively, the unit 1516 may receive the relevant design data indirectly on a suitable signal storage medium such as a diskette, a replaceable hard disc, an optical storage device such as a CD-ROM or OVO-ROM, a magnetic tape or similar.

Computer 150 also includes a graphical user interface that resides within machine-readable media to direct the operation of computer 150. Any suitable machine-readable media may retain the graphical user interface, such as a random access memory (RAM) 152, a read-only memory (ROM) 153, a magnetic diskette, magnetic tape, or optical disk (the last three being located in disk and tape drives 158). Any suitable operating system and associated graphical user interface (e.g., Microsoft Windows, Linux) may direct CPU 151. In addition, computer 150 includes a control program 1517 that resides within computer memory storage 1516. Control program 1517 contains instructions that when executed on CPU 151 allow the computer 150 to carry out the operations described with respect to any of the methods of the present invention.

Those skilled in the art will appreciate that the hardware represented in FIG. 8 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described.

In the example depicted in FIG. 15, the computer program product for carrying out the method of the present invention can reside in any suitable memory. However, it is important that while the present invention has been, and will continue to be, that those skilled in the art will appreciate that the mechanisms of the present invention are capable of being distributed as a computer program product in a variety of forms, and that the present invention applies equally regardless of the particular type of signal bearing media used to actually carry out the distribution. Examples of computer readable signal bearing media include: recordable type media such as floppy disks and CO ROMs and transmission type media such as digital and analogue communication links.

Accordingly, the present invention also includes a software product which includes which when executed on a suitable computing device carries out any of the methods of the present invention. In particular, the code includes means for receiving object layer data describing each layer of the object; means for defining for each layer of the object the region that requires support as well as a number of support points in the region that are to be connected to the support; means for defining the support mesh as the Boolean difference of a 3-D initial mesh, which fills up the envelope of the rapid prototyping system, and the object; means for connecting the support points of the object to the support mesh and means for generating support data by transforming the support mesh into a support structure. The code may include means for outputting a digital description of the design of the support.

Suitable software can be obtained by programming in a suitable high level language such as C and compiling on a suitable compiler for the target computer processor.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

Embodiments of the present invention may provide the following advantages: (1) generation of the support data is made easier, faster and less time consuming due to employing more automation and less user analysis of the support to be built; (2) reducing the material cost and production time of the support; (3) generating a better support that leads to higher yields for an object made by means of stereo lithography or any other rapid prototype production method since the invention determines for each layer of the object where the layer has to be supported, resulting in less failures due to lack of support; (4) use of a 3-D regular mesh as the initial mesh typically uses less memory as they can be stored in a more compact representation; and (5) allowing an easier way to separate the support from the build object, resulting in less post-processing of the build object.

What is claimed is:

1. A support structure for supporting a three-dimensional object during additive manufacturing of the object with the support structure on a layer by layer basis on top of a platform, the support structure comprising:
a support mesh for the object, the support mesh comprising a plurality of nodes connected by a plurality of edges, the support mesh being configured to be positioned between the platform and at least a portion of the object not supported by an underlying layer in a direction perpendicular to the platform, wherein at least some of the plurality of edges comprise a plurality of vertical edges oriented perpendicular to the platform and a plurality of diagonal edges that form a plurality of rhombuses, wherein each of the plurality of rhombuses is formed by four diagonal edges of the plurality of diagonal edges that intersect at four nodes of the plurality of nodes and includes a vertical edge along a diagonal of the rhombus that intersects two of the four nodes; and
a connection edge between the at least the portion of the object and a first node of the plurality of nodes of the support mesh, the connection edge being oriented downwardly from the at least the portion of the object toward the platform.

2. The support structure of claim 1, wherein at least some of the plurality of nodes and plurality of edges of the support mesh form a rhombus pattern.

3. The support structure of claim 1, wherein at least some of the plurality of nodes and plurality of edges of the support mesh form a pattern of regular polygons.

4. The support structure of claim 1, wherein the first node is the closest node in the support mesh to a support point on the at least the portion of the object.

5. The support structure of claim 1, wherein the support mesh is a columnar mesh.

6. The support structure of claim 1, wherein the connection edge is coupled to the at least the portion of the object at a first support point on the at least the portion of the object that is offset from an outer edge of the object by an offset.

7. The support structure of claim 1, wherein the support structure comprises a plurality of connection edges each coupled to one of a plurality of support points on the at least the portion of the object, wherein a maximum distance between neighboring support points of the plurality of support points is smaller than twice a critical overhang of a layer.

8. The support structure of claim 7, wherein the plurality of connection edges comprise the connection edge and a second connection edge separated by the maximum distance.

9. The support structure of claim 1, wherein the plurality of nodes comprises at least one boundary node that is on an exterior boundary of the support mesh and at least one interior node that is within the support mesh.

10. The support structure of claim 1, wherein the support mesh is spaced apart from the object by an offset.

11. The support structure of claim 10, wherein the support mesh is configured to attach to the object through a connection structure extending through the offset, and wherein the connection structure comprises one or more of a bar-shape, a cylinder, a pyramid, or a cone.

12. The support structure of claim 11, wherein the connection structure comprises a first structure, a second structure, and an intermediate region connecting the first structure and the second structure.

13. The support structure of claim 1, wherein the support mesh comprises a first portion of the mesh and a second portion of the mesh, wherein the first portion is closer to the object than the second portion, and wherein the edges of the first portion are spaced more closely together than edges of the second portion.

14. A support structure for supporting a three-dimensional object during additive manufacturing of the object with the support structure on a layer by layer basis on top of a platform, the support structure comprising:
   a support mesh for the object, the support mesh comprising a plurality of nodes connected by a plurality of edges, the support mesh being configured to be positioned between the platform and at least a portion of the object not supported by an underlying layer in a direction perpendicular to the platform; and
   a connection edge between the at least the portion of the object and a first node of the plurality of nodes of the support mesh, the connection edge being oriented downwardly from the at least the portion of the object toward the platform, wherein the connection edge is at a first angle with respect to the platform, wherein the plurality of edges are at one or more angles with respect to the platform, wherein the first angle is different than each of the one or more angles.

* * * * *